United States Patent [19]

Nguyen et al.

[11] Patent Number: 5,414,821
[45] Date of Patent: May 9, 1995

[54] METHOD OF AND APPARATUS FOR RAPIDLY LOADING ADDRESSING ENVIRONMENT BY CHECKING AND LOADING MULTIPLE REGISTERS USING A SPECIALIZED INSTRUCTION

[75] Inventors: John Z. Nguyen, Roseville; Merwin H. Alferness, New Brighton, both of Minn.

[73] Assignee: Unisys Corporation, Blue Bell, Pa.

[21] Appl. No.: 809,389

[22] Filed: Dec. 17, 1991

[51] Int. Cl.⁶ .............................................. G06F 9/00
[52] U.S. Cl. ...................................... 395/375; 395/800; 364/228.1; 364/228.2; 364/228.3; 364/230.1; 364/230.6; 364/232.1; 364/232.93; 364/DIG. 1
[58] Field of Search ............... 395/375, 250, 200, 400, 395/425, 500, 600, 800; 364/DIG. 1, DIG. 2

[56] References Cited

U.S. PATENT DOCUMENTS

| | | | |
|---|---|---|---|
| 3,389,380 | 6/1968 | Ashbaugh et al. | |
| 3,461,433 | 8/1969 | Emerson. | |
| 4,096,568 | 6/1978 | Bennett et al. | 395/400 |
| 4,297,743 | 10/1981 | Appell et al. | 395/650 |
| 4,825,358 | 4/1989 | Letwin | 395/700 |
| 4,825,363 | 4/1989 | Baumann et al. | 395/375 |
| 4,827,400 | 5/1989 | Dunwell et al. | 395/400 |
| 4,827,406 | 5/1989 | Bischoff et al. | 395/425 |
| 4,835,677 | 5/1989 | Sato et al. | 395/700 |
| 4,841,436 | 6/1989 | Asano et al. | 395/250 |
| 4,853,849 | 8/1989 | Bain, Jr. et al. | 395/400 |
| 4,862,349 | 8/1989 | Foreman et al. | 395/700 |
| 4,890,221 | 12/1989 | Gage | 395/775 |
| 4,903,196 | 2/1990 | Pomerene et al. | 395/375 |
| 4,926,316 | 5/1990 | Baker et al. | 395/425 |
| 4,939,640 | 7/1990 | Bachman et al. | 395/375 |
| 5,125,087 | 6/1992 | Randell | 395/425 |
| 5,144,551 | 9/1992 | Cepulis | 395/425 |
| 5,155,834 | 10/1992 | Ryan et al. | 395/425 |
| 5,167,026 | 11/1992 | Murray et al. | 395/375 |
| 5,212,778 | 5/1993 | Dalby et al. | 395/400 |
| 5,226,166 | 7/1993 | Ishida et al. | 395/800 |
| 5,241,635 | 8/1993 | Papadopoulos et al. | 395/375 |

OTHER PUBLICATIONS

Harman, "The Motorola MC68000 Microprocessor Family: Assembly Language, Interface Design, and System Design" 1985, pp. 161–167.
Krick et al. "The Evolution of Instruction Sequencing" IEEE Apr. 1991, pp. 5–15.
Hartley "Compile-Time Program Restructuring in Multiprogrammed Virtual Memory" IEEE 1988, pp. 1640–1644.
William H. Murray III and Chris H. Pappas, "80386/80286 Assembly Language Programming", Osborne McGraw-Hill, Berkeley, Calif., 1986, pp. 96–106.

Primary Examiner—Alyssa H. Bowler
Assistant Examiner—Dzung Nguyen
Attorney, Agent, or Firm—Nawrocki, Rooney & Siverston

[57] ABSTRACT

An apparatus for and method of loading the addressing environment of a large scale multiprogrammed instruction processor. The addressing environment is normally loaded upon initiation of an application program. Providing a separate addressing environment for each application program permits the software to be developed using virtual addressing. The addressing environment is loaded to permit the instruction processor to convert the virtual addresses to absolute addresses. The addressing environment is specified by a stack of base registers. These are loaded sequentially from a data store containing the virtual address of the initial location of each data bank to be accessed. The virtual addresses are converted to absolute addresses for loading into the base registers. During the loading process, each virtual address is evaluated to determine if it defines a valid data bank. If it does, the corresponding base register is loaded. If the virtual address is not valid, the effort to load the corresponding base register is saved and the next valid virtual address is loaded.

4 Claims, 9 Drawing Sheets

| | | |
|---|---|---|
| B1 $L_1$ | $BDI_1$ | $OFFSET_1$ |
| B2 $L_2$ | $BDI_2$ | $OFFSET_2$ |
| B3 $L_3$ | $BDI_3$ | $OFFSET_3$ |
| B4 $L_4$ | $BDI_4$ | $OFFSET_4$ |
| B5 $L_5$ | $BDI_5$ | $OFFSET_5$ |
| B6 $L_6$ | $BDI_6$ | $OFFSET_6$ |
| B7 $L_7$ | $BDI_7$ | $OFFSET_7$ |
| B8 $L_8$ | $BDI_8$ | $OFFSET_8$ |
| B9 $L_9$ | $BDI_9$ | $OFFSET_9$ |
| B10 $L_{10}$ | $BDI_{10}$ | $OFFSET_{10}$ |
| B11 $L_{11}$ | $BDI_{11}$ | $OFFSET_{11}$ |
| B12 $L_{12}$ | $BDI_{12}$ | $OFFSET_{12}$ |
| B13 $L_{13}$ | $BDI_{13}$ | $OFFSET_{13}$ |
| B14 $L_{14}$ | $BDI_{14}$ | $OFFSET_{14}$ |
| B15 $L_{15}$ | $BDI_{15}$ | $OFFSET_{15}$ |

FIG. 7

METHOD OF AND APPARATUS FOR RAPIDLY LOADING ADDRESSING ENVIRONMENT BY CHECKING AND LOADING MULTIPLE REGISTERS USING A SPECIALIZED INSTRUCTION

CROSS REFERENCE TO CO-PENDING APPLICATIONS

The present application is related to U.S. patent application Ser. No. 07/762,282, filed Sep. 19, 1991, entitled "Cooperative Hardware and Microcode Control System for Pipelined Instruction Execution", and U.S. patent application Ser. No. 07/762,276, filed Sep. 19, 1991, entitled "Data Coherency Protocol for Multi-Level Cached High Performance Multiprocessor System", both assigned to the assignee of the present invention and both incorporated herein by reference.

BACKGROUND OF THE INVENTION

1. Field of the Invention

The present invention generally relates to general purpose digital data processing systems and more particularly relates to such systems which execute multiple programs.

2. Description of the Prior Art

It is now common in large scale data processing systems to permit software developers to treat real storage as virtual memory. This is a technique wherein all memory accesses by a specific user program are relative in nature. The major advantage of this approach is that memory management can be efficiently performed by the system at the time of program execution depending upon resource availability and requests from other users. This memory management appears transparent to the user. The 2200/600 system available from the assignee of the present invention, and incorporated herein by reference, is such a system employing virtual addressing.

U.S. Pat. No. 4,827,406 issued to Bischoff et al, shows one method of handling virtual addressing. It is currently most desirable to structure an architecture in which the software makes address references relative to an addressing environment which can be readily loaded along with the program and can be modified during program operation as necessary. The actual physical memory hardware must be addressed, of course, using an real rather than a relative address. To accomplish this, the virtual address is converted to an absolute address using a translation table. A typical translation scheme is shown in U.S. Pat. No. 4,827,400 issued to Dunwell et al.

Further convenience and performance enhancements occur by dividing the virtual address space into blocks and by paging the real address space. The system is thus enhanced by providing logical divisions for programming purposes while accessing main memory by a hardware efficient block size. The conversion hardware efficiently performs the required translations without subjecting the user to the resulting bookkeeping. As a result, the storage resources of the system are efficiently managed in real time without unnecessary concern by the users.

The registers which store the data permitting conversion from the virtual address of a software program to the real address used by the physical storage system are assumed to be unique to that software program. As different programs are loaded and run, the contents of these registers must be modified. Similarly, the contents of one or more of the registers may need to be modified during the operation of a given program to permit access to different pages of data. U.S. Pat. No. 4,862,349 issued to Foreman et al, shows a technique for user modification of control block data. However, care must be exercised to prevent one program from inadvertently impacting another, unrelated program. U.S. Pat. No. 4,835,677 issued to Sato et al, shows a typical hardware protection approach. Notification to multiple users of a General Purpose Register set is provided by the technique of U.S. Pat. No. 4,903,196 issued to Pomerene et al.

The most common opportunities for a change to the data registers providing virtual to absolute address translation are during interrupts which transition the processor from one state to another, and at the initiation of an application program after the partial or complete run of a different and unrelated application program. The assignee of the present invention has for some time provided systems wherein the executive and user states have dedicated registers to mitigate a portion of this problem. A less efficient approach may be found in U.S. Pat. No. 4,825,358 issued to Letwin. U.S. Pat. No. 4,853,849 issued to Bain, Jr. et al, shows an alternative technique for input/output transfers.

Most modern large scale data processing systems also employ some form of microprocessing and pipelining. U.S. Pat. No. 4,825,363 issued to Baumann et al, and U.S. Pat. No. 4,841,436 issued to Asano et al, show microprocessor based architectures. Saving the processing environment upon the occurrence of a microinterrupt produces a similar need. U.S. Pat. No. 4,890,221 issued to Gage and U.S. Pat. No. 4,939,640 issued to Bachman et al, show architectures wherein the environment is saved by storing all of the variables.

SUMMARY OF THE INVENTION

The present invention overcomes many of the disadvantages of the prior art by providing a method of and apparatus for rapidly modifying the environment registers of an instruction processor. The greatest advantage of this approach is when changing the complete operating environment such as occurs upon initiation of a new or different application program. A relatively larger saving is achieved for systems having a relatively larger number of registers which may be modified. The preferred mode of the present invention is concerned with changes to the addressing environment. However, other environmental changes are also envisioned.

In the preferred mode, an active base table is employed to store the the virtual addresses of the logical storage banks used within an individual application program. The bank descriptor indices and offsets provide access to the bank descriptor tables which define the corresponding absolute memory addresses to be stored within the stack of base registers. It is convenient during the software development process to use a number of different base registers to access the logical banks needed by the program. Upon the initiation of a given application program, the active base table and the base register stack is loaded with the data necessary to execute that application program.

The design of the preferred mode instruction processor provides 15 separate base registers. For each base register which is to be used, the virtual address of the logical bank, as defined by the user program, must be converted into an absolute address through reference to one of the bank descriptor tables. Most application programs do not use all of the base registers. A performance advantage is achieved by converting virtual addresses to absolute addresses only for those base registers which are actually used by the application program.

At the time of program initialization, all 15 base registers are tagged invalid and a fixed length segment of data is accessed and transferred to the active base table. This fixed length segment is of sufficient length to provide a virtual address for each of the 15 base registers. During this first pass of the operation, each of the 15 virtual addresses is scanned to determine if it defines a valid base register entry. A flag register bit is set to indicate a valid base register definition.

Only those base registers are actually loaded, during the second pass of the operation, for which the corresponding entry in the active base table contains a valid base register definition (i.e. the flag register bit is set). As each base register is loaded, the associated flag is cleared in the flag register. When all flags have been cleared, a completed environment load is indicated.

The operation is performed from a single program instruction with the associated data formatted to permit the block transfer. This instruction also provides an opportunity for a high degree of pipelining. Though the preferred mode is associated with rapid loading of the base register addressing environment for initiating application programs, the technique is applicable to various other environmental changes depending upon the machine architecture.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 7 is a schematic diagram of the contents of the active base table;

DETAILED DESCRIPTION OF THE PREFERRED EMBODIMENTS

Figure 1:
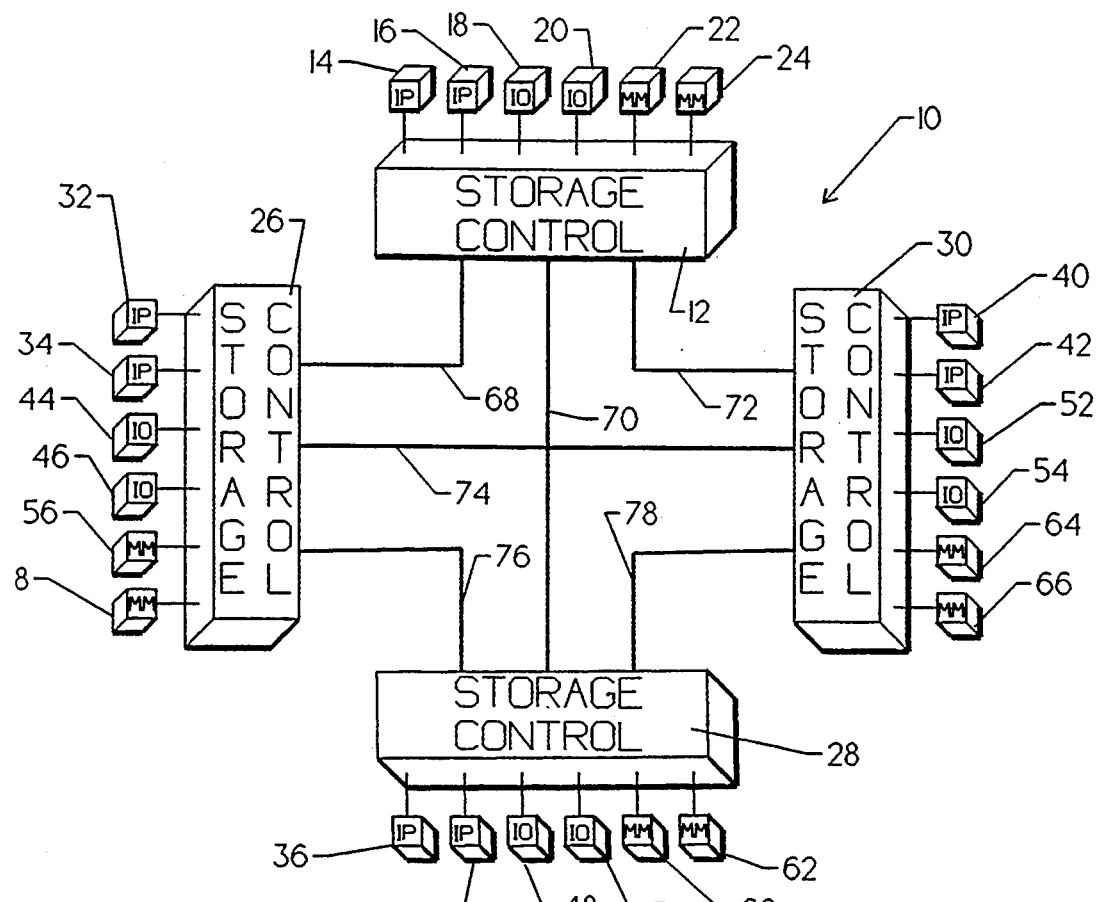
FIG. 1 is a schematic diagram of a fully populated data processing system incorporating the present invention.

FIG. 1 is an overall diagram of fully populated data processing system 10 according to the present invention. Data processing system 10 includes four individual processing clusters, each having its own storage controller and each having point-to-point communication with the other clusters via a storage controller to storage controller interface.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output processor 18, input/output processor 20, main memory module 22 and main memory module 24. Each of instruction processors 14 and 16 (along with similar instruction processors 32, 34, 36, 38, 40, and 42) has internal dedicated cache resources in the form of an instruction cache and an operand cache. These elements, along with the associated data invalidity logic, are described in more detail below. A more general description of the construction and operation of instruction processors 14 and 16 may be found in the above referenced and commonly assigned co-pending U.S. patent application which has been incorporated by reference.

Input/output processors 18 and 20, along with main memory modules 22 and 24, may be elements currently available, such as found in the Unisys Model 2200/600 series. Input/output processors 44, 46, 48, 50, 52, and 54 and main memory modules 56, 58, 60, 62, 64, and 66 may be similarly found.

Figure 2:
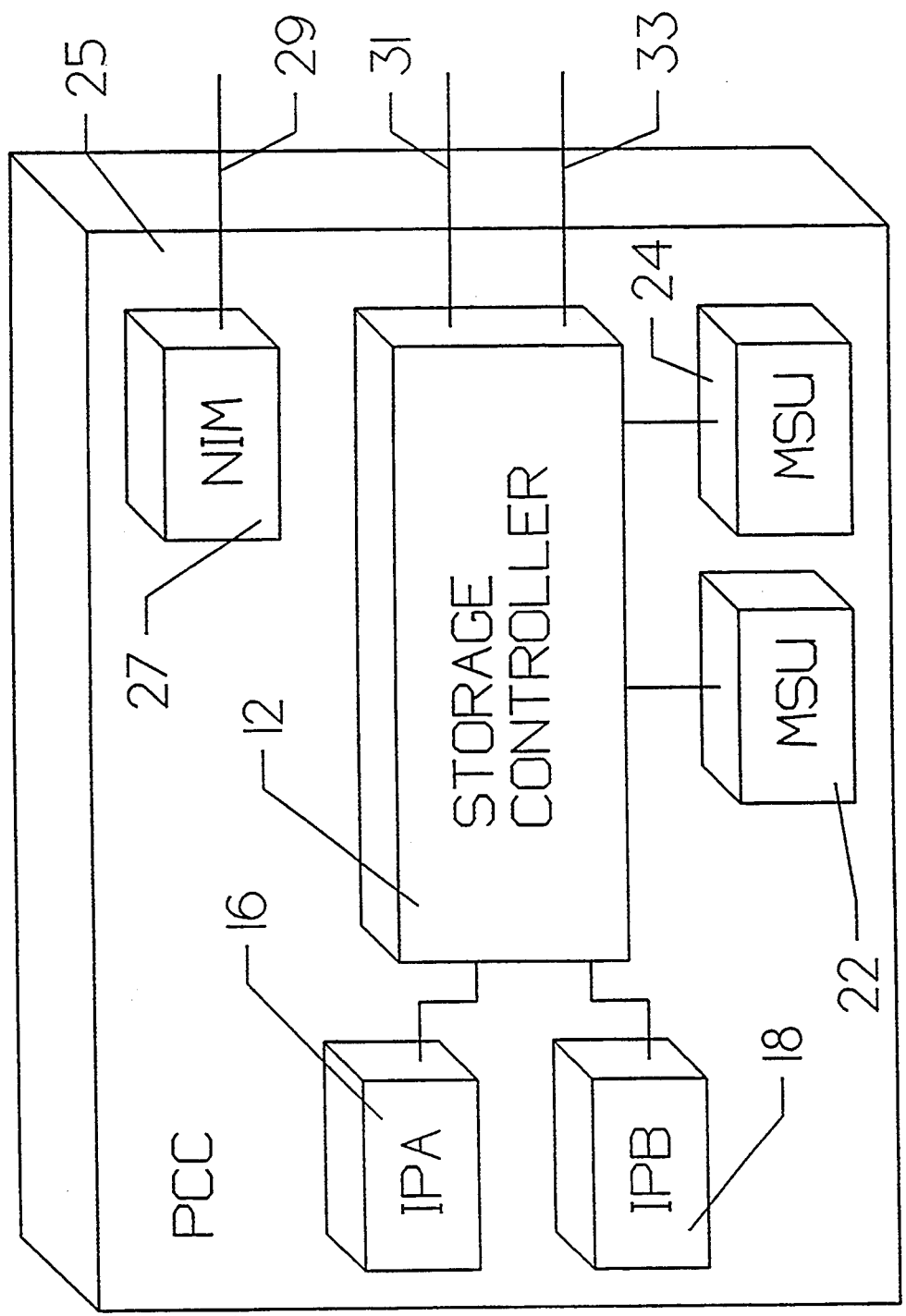
FIG. 2 a pictorial diagram showing the packaging arrangement of the data processing system of FIG. 1.

FIG. 2 is a schematic diagram showing the packaging of a portion of data processing system 10. A major physical element of data processing system 10 is Processing Complex Cabinet, PCC 25. Within fully populated PCC 25 is located instruction processors 16 and 18 (i.e. IPA and IPB). In the preferred mode, each of these instruction processors is packaged on a single high density circuit board. The memory storage units 22 and 24 are coupled to storage controller 12 as explained above.

Network interface module (i.e. NIM) 27 provide an interface to the operator console via cable 29. Cables 31 and 33 couple input/output units 18 and 20 (see also FIG. 1) to storage controller 12. Input/output units 18 and 20 are physically packaged in an Input/output Complex Cabinet (i.e. ICC) which is not shown for clarity. Other referenced elements are as previously described.

Figure 3:
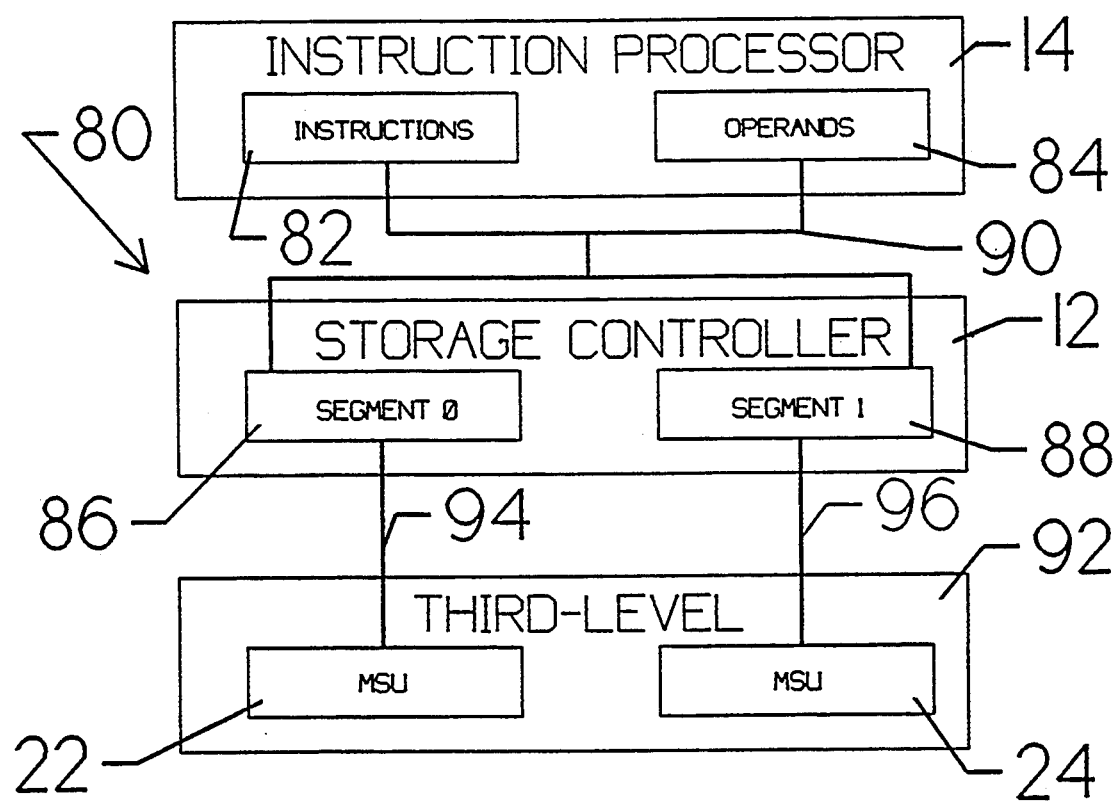
FIG. 3 is a schematic diagram of the levels of storage for a single instruction processor.

FIG. 3 is a flow diagram 80 showing the hierarchical arrangement of the three levels of storage within data processing system 10. Instruction processor 14 contains an instruction cache 82 and an operand cache 84, each storing 8k of 36 bit words. These are internal to instruction processor 14 and dedicated to the operations undertaken therein. By partitioning the internal dedicated cache resources in this manner, there is a certain concurrence of cache accesses associated with normal instruction execution.

Upon the request of instruction processor 14 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 90 for the block of eight 36 bit words containing the desired data element. A more detailed explanation of the operation of instruction cache 82 and operand cache 84 is found below.

Storage controller 12 contains an intermediate level cache segment of 128k 36 bit words for each for each main memory module within the cluster. In the present illustration, storage controller 12 contains segment 0 cache 86 and segment 1 cache 88. These cache resources are shared by all users of the main memory within the cluster to include both local and remote users. Any memory request to storage controller 12 is routed to the appropriate directory of segment 0 cache 86 or segment 1 cache 88 to determine if the desired data element is present and valid. This routing is based upon the address requested, since the intermediate cache resources are partitioned in address space to correspond to the associated main memory module.

If present and valid, the requested data element is supplied as an eight word block. If the requested data element is not validly present in segment 0 cache 86 or segment 1 cache 88 (depending upon the requested address), the data is requested from third level storage 92 containing main memory modules 22 and 24 via interfaces 94 and 96, respectively. In the preferred mode, main memory modules 22 and 24 each contain 64 meg. words of storage.

Each data element request to storage controller 12 is made through a separate interface. For a fully populated system, this includes two instruction processors, two input/output processors, and three other storage controllers (see also FIG. 1). Each data element request is divided between segment 0 cache 86 and segment 1 cache 88 based upon requested address. Only if the requested data element is not validly present in the appropriate intermediate level cache resource is an access request made to third level 92.

Figure 4:
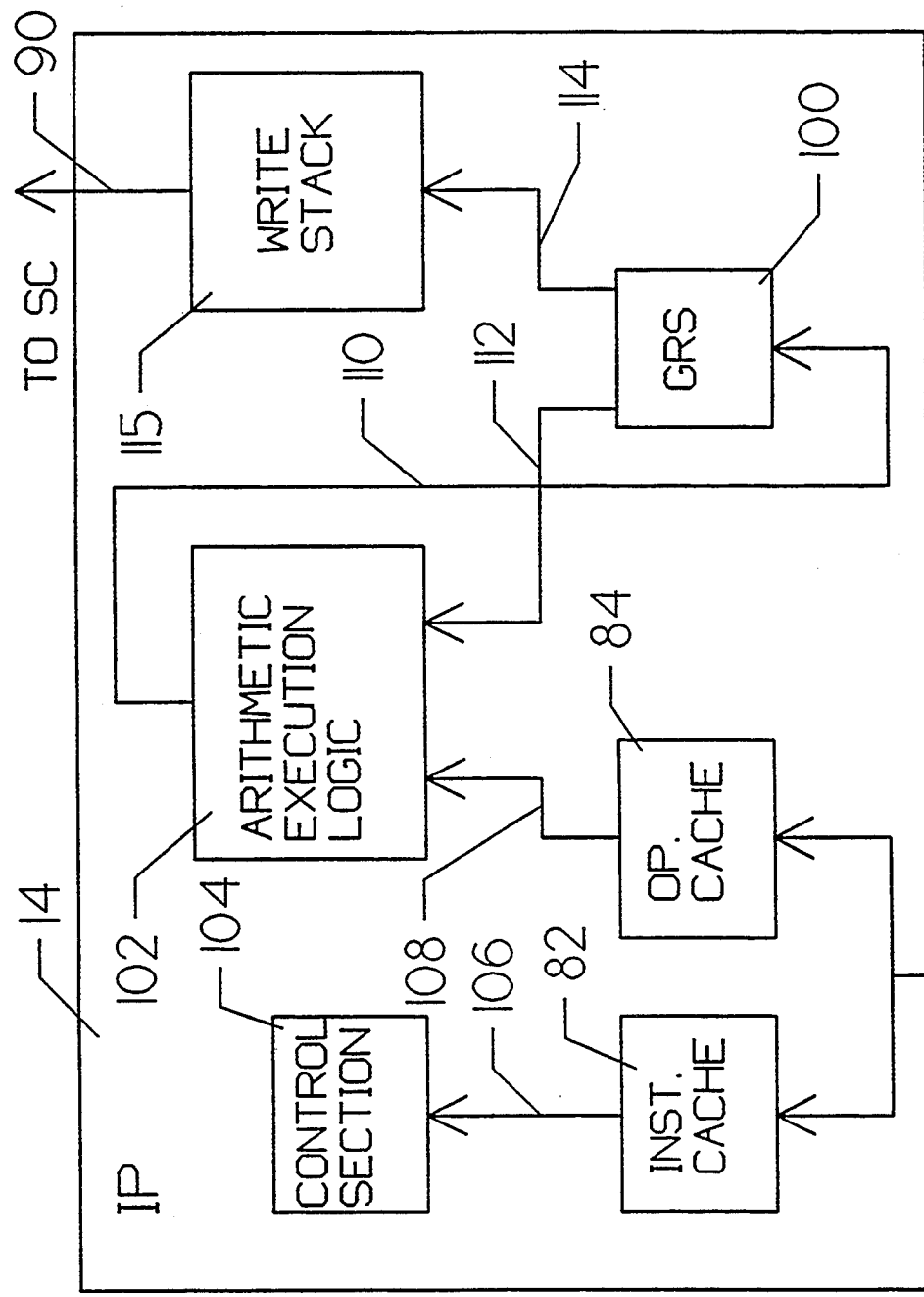
FIG. 4 is a simplified block diagram showing the major elements of the instruction processor.

FIG. 4 is a simplified block diagram of instruction processor 14 showing the major data and control paths. Cable 90, providing the data transfer path between storage controller 12 and instruction processor 14, is actually a two-way path. Data is accessed by storage controller 12 and routed to either instruction cache 82 or operand cache 84 depending upon whether the initial request was for instruction data or operand data. In accordance with usual local cache operation, instruction cache 82 and operand cache 84 temporarily store the data for use by instruction processor 14. Cable 90 also couples write data from write stack 115 to storage controller 12 for longer term storage. Priority for this shared interface is ordinarily given to read data requests requiring write data to be queued in write stack 115. The exception to giving priority to read data is whenever data is to be read from a location for which a write access has been queued.

Instructions from instruction cache 82 are provided via path 106 to control section 104 for decoding via microcode controller and hardwired control logic. This is discussed in greater depth below. Arithmetic execution logic 102 receives operand data via path 108 and performs the specified operation using a combination of microcode control and hardwired control as explained in greater detail below.

Most arithmetic instructions operate upon data which is temporarily stored in general register stack 100. This permits most rapid access to the data, because that data is directly accessed from an extremely fast storage stack. Similarly, arithmetic results are often returned to general register stack 100 for temporary storage until further arithmetic processing. Data is routed to general register stack 100 by path 110. Data from general register stack 100 is routed back to arithmetic execution logic 102 via path 112 and to write stack 115 via path 114. The data transferred to write stack 115 is queued for storage by storage controller 12 as discussed above.

Figure 5:
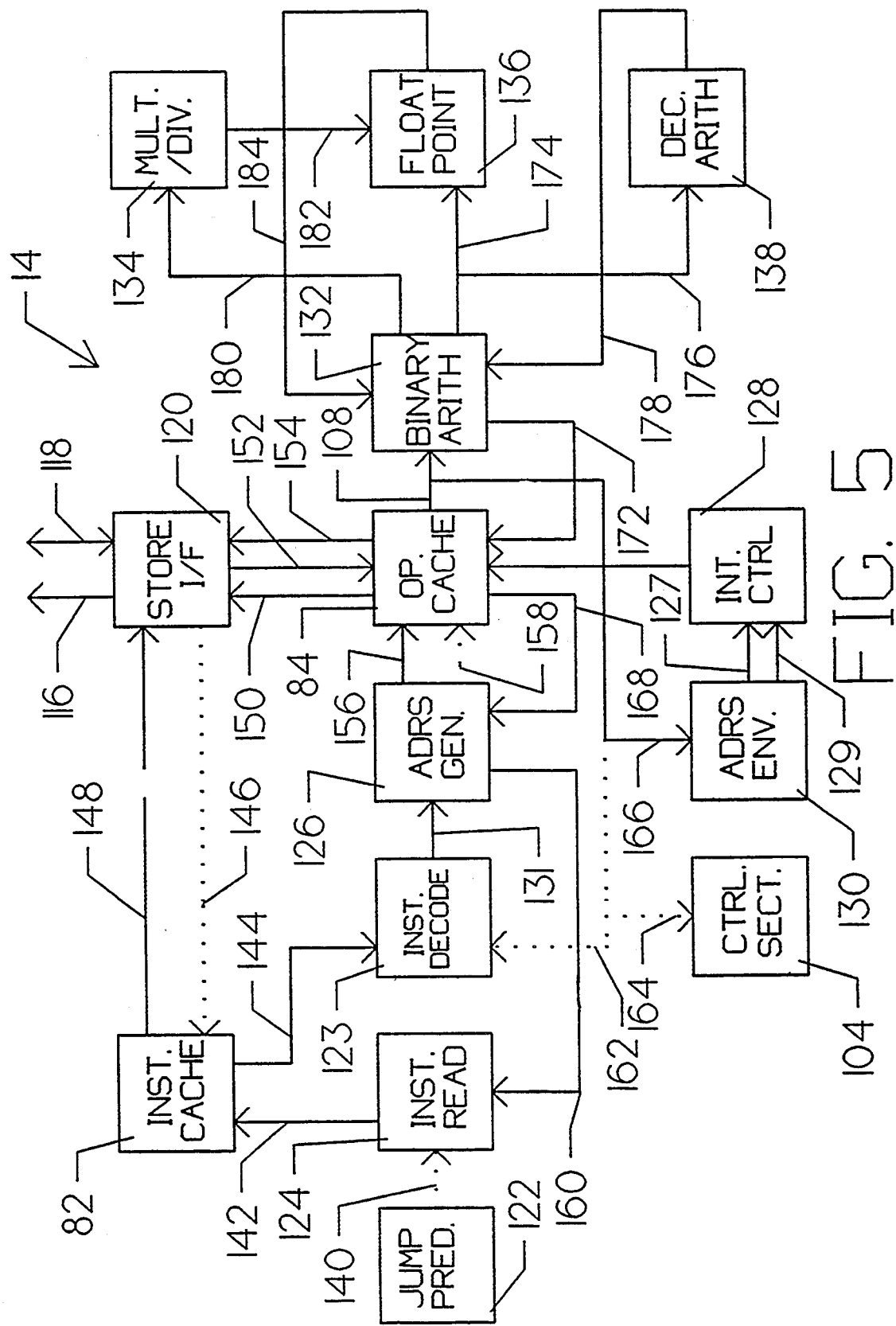
FIG. 5 is a detailed block diagram of the instruction processor.

FIG. 5 is a more detailed block diagram of instruction processor 14. The major data paths are shown, with the solid line paths signifying 72 bit, double word, transfer paths; the dashed line paths signifying addressing paths; and the dotted lines indicating data paths of no greater the 36 bits. Control line paths are not shown for clarity.

The interface to storage controller 12 is via cable 90, as described above. It consists of write cable 116 and read/write cable 118. Each of these data paths couples a 72 bit double word in parallel fashion. The function of write stack 115 (see also FIG. 4) is incorporated within store interface 120 which also provides the request/acknowledge synchronization logic. Addressing information for store interface 120 is sent from instruction cache 82 via cable 148 and operand cache 84 via cable 150 for a corresponding cache miss. Instructions are sent to instruction cache 82 via path 146. Because instructions are normally 36 bit words, path 146 has a width of 36 bits. Operand data read by storage controller 12 is transferred from store interface 120 to operand cache 84 by path 152. Similarly, write operand data is sent from operand cache 84 to store interface 120 via path 154. Both path 152 and path 154 have a width of 72 bits to accommodate double word operands.

Instructions to be executed are addressed by instruction read 124. The addresses are computed using one of the base registers located within address environment 130 as explained in more detail below. If the instruction is the next sequential instruction, its address is determined by incrementing the program address counter. If the instruction to be executed is addressed by a branch or jump instruction, the address is computed by address generator 126 and supplied via path 160. Alternatively, the address is supplied by jump prediction 122 via path 140 during operation in the jump prediction mode. The address of the next instruction is provided to instruction cache 82 via path 142.

The next addressed instruction is fetched from instruction cache 82 if a match is found. If the request results in a cache miss, storage controller 12 is requested to read the memory block containing the instruction as discussed above. In either case, the instruction is provided to instruction decoder 123 via path 144. The instruction is decoded through the use of a microcode controller by instruction decode 123, and the operand address is computed by address generator 126 from the data received via path 131.

Operand cache 84 contains general register stack 100 (see also FIG. 4). The cache is addressed by the output of address generator 126 received from path 158. Direct operands are received on path 156. If a match is not made in operand cache 84, a read request is made of storage controller 12 through store interface 120 as explained above. If a match is found in operand cache 84 or if the instruction specifies a direct operand received on path 156, the operand data is more immediately produced. In either case, the operand data is routed in accordance with the operation to be performed as specified by the instruction. Indirect operands cause the new operand address to be transferred to address generator 126 via path 168. Operands are transferred to binary arithmetic 132 for mathematical computation via path 108 or to address environment 130 via path 166.

Binary arithmetic 132 provides the basic control for all arithmetic operations to be performed on data received via path 108. Floating point operations are scaled and controlled by floating point logic 136 which receives operand data on path 174. Floating point results are returned to binary arithmetic 132 by path 184. Mult./div. 134 performs the basic multiplication and division operations for fixed point instructions. Operand data is received via path 180 and the products/quotients returned via path 182 and floating point logic 136. Decimal arithmetic 138 receives operand data on path 176 and returns results via path 178. Decimal arithmetic performs special purpose decimal operations.

Another category of instructions, and those of most concern to the preferred mode of the present invention, involves a change to the base registers within addressing environment 130. The data is supplied to addressing environment 130 via path 166. Base register contents are supplied to interrupt control 128 via paths 127 and 129. It is in the change from user mode to executive mode and in transition from one application program to another (usually through the executive mode) that the base registers of addressing environment 130 are normally changed. Interrupt control 128 provides the interrupt data to operand cache 84 via path 170. Control section 104 provides the overall microcode control.

The operation of instruction processor 14 is intended to occur in the pipelined mode whenever feasible. A more detailed description of the timing of this pipelined operation may be found in the above referenced co-pending application which has been incorporated herein by reference. The remaining referenced components are as previously discussed.

Figure 6:
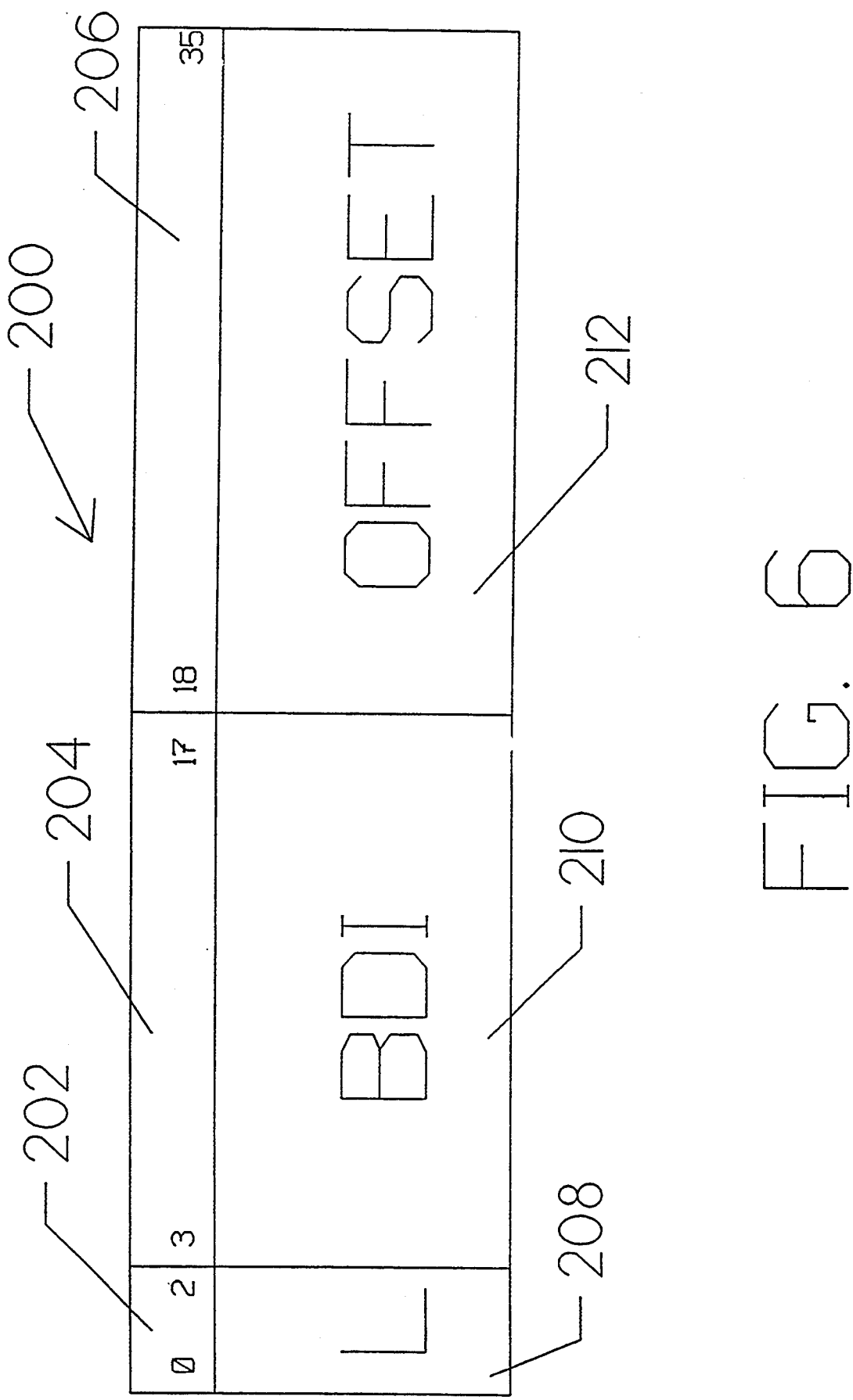
FIG. 6 shows the format of a virtual address.

FIG. 6 shows the format 200 of a virtual address. As explained above, the virtual address is used by an application program to define the initial memory location within a logical data bank. The memory references made by that application program are relative to these virtual addresses. At the time of application program execution, each logical data bank is assigned a location within the physical storage system in accordance with the memory management algorithm. Each virtual address must be converted at run time to an absolute address for reference to the physical storage location. The absolute address associated with a logical bank of data is loaded into the corresponding one of the base registers.

The virtual address format 200 has a width of 36 bits, which is divided into three separate fields. Field 202, consisting of the three least significant bit positions 0–2, contains variable 208, designated "L". This variable is a control character, which specifies one of eight possible bank descriptor tables.

Bit positions 3–17 are partitioned as field 204. This 15 bit field is used to store variable "BDI", the Bank Descriptor Index. The BDI provides an index into the bank descriptor table selected by variable 208. This index uniquely defines one of the bank descriptors within that bank descriptor table. The bank descriptor table entry thus defined contains an absolute address consisting of 52 bits along with access limits and various control bits.

The most significant half of the virtual address (i.e. bit positions 18–35) define field 206 which is used to store offset 212. This variable is added to the contents of the uniquely identified entry within the bank descriptor table to produce the absolute address for the initial location of the corresponding logical data bank. This absolute address is stored within the associated base register for rapid access to the physical storage location of a logical bank being referenced by a particular instruction within the application program. Translation of the absolute address into a real address occurs within the paging function which is further defined in the above referenced commonly assigned U.S. Patent Applications.

FIG. 7 shows the contents of the active base table 214 comprising the entire set of 15 user supplied virtual addresses which define the contents for the corresponding ones of the 15 user base registers. This set consists of active base table entries B1, B2, . . . , and B15. Loaded therein are entries 216, 218, . . ., and 244, respectively. Each of these entries is as defined in FIG. 6.

Figure 8:
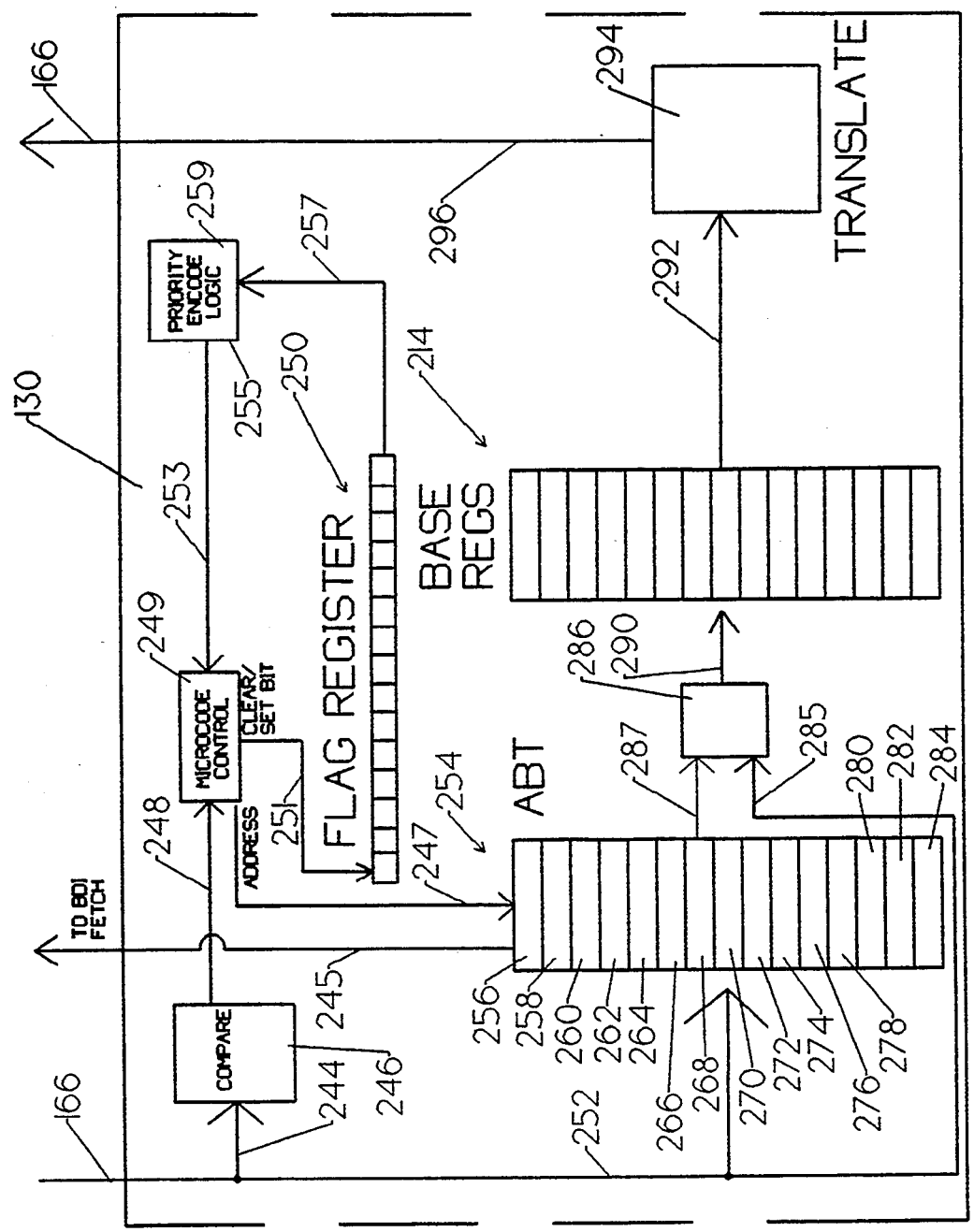
FIG. 8 shows the major instruction processor elements associated with rapid loading of the base registers.

FIG. 8 is a block diagram of some major elements of addressing environment 130. As discussed above, the primary function of addressing environment 130 is to store the variables associated with the operation of a particular program which permit conversion of virtual addresses used within that program to the absolute addresses. For clarity, only those elements are shown which relate to application program or user environment.

During the environment loading operation (i.e. an LAE or Load Addressing Environment instruction), an ordered data set, containing up to 15 virtual addresses, is received via path 166 sufficient to load all 15 user base registers. This data stream is routed to comparator 246 via path 244 to determine which of the virtual addresses define valid base register entries. Within the preferred embodiment and not to be considered limiting of the present invention, a valid entry is one in which the L,BDI field(s) is not equal to zero. For each of the 15 potential entries, comparator 246 notifies microcode controller 249 via line 248 to set the corresponding bit of flag register 250 via path 251 if the entry is valid.

Whether or not the potential base register definition is valid, it is loaded into the corresponding one of the registers 256, 258, . . . , and 284 of active base table 254 via path 252. In parallel, all of the 15 base registers are tagged invalid. After the entire data set has been processed in this fashion, the valid, but only the valid, entries are converted via the bank descriptor tables (as described in more detail above) into base register entries, which are loaded into the appropriate base registers of base register stack 214.

Loading occurs via path 285 to base load and subset logic 286. After adding of the offset via line 287, the absolute address is transferred via path 290 to base register stack 214. Only the valid base register data is loaded during this second pass because priority encode logic 259 receives an indication of all set validity bits from flag register 250 via path 257. Priority encode logic 259 provides microcode controller 249 with an index which represents the first non-void ABT entry (i.e. the associated flag is set within flag register 250). This index is used by microcode controller 249 to access the appropriate active base table entry and load the associated one of the base registers of base register stack 214. As the loading occurs, the associated flag of flag register 250 is cleared by microcode controller 249 via path 251 and the next highest priority flag bit becomes visible. When all flags are clear, an index of zero informs microcode controller 249 that the environment load is complete. A primary advantage of this approach is the performance enhancement resulting from loading only valid base register data.

Upon access to a particular one of the base registers of base register stack 214 for address formation, the contents are supplied to translator 294 via path 292. Translator 294 uses the sum of the base register value and the relative address from the current instruction to produce the absolute address for the access defined by that instruction. The contents of the base register also provide a security limit check on the absolute address thus computed. This absolute address is transferred to the paging function for storage access via path 296.

Figure 9:
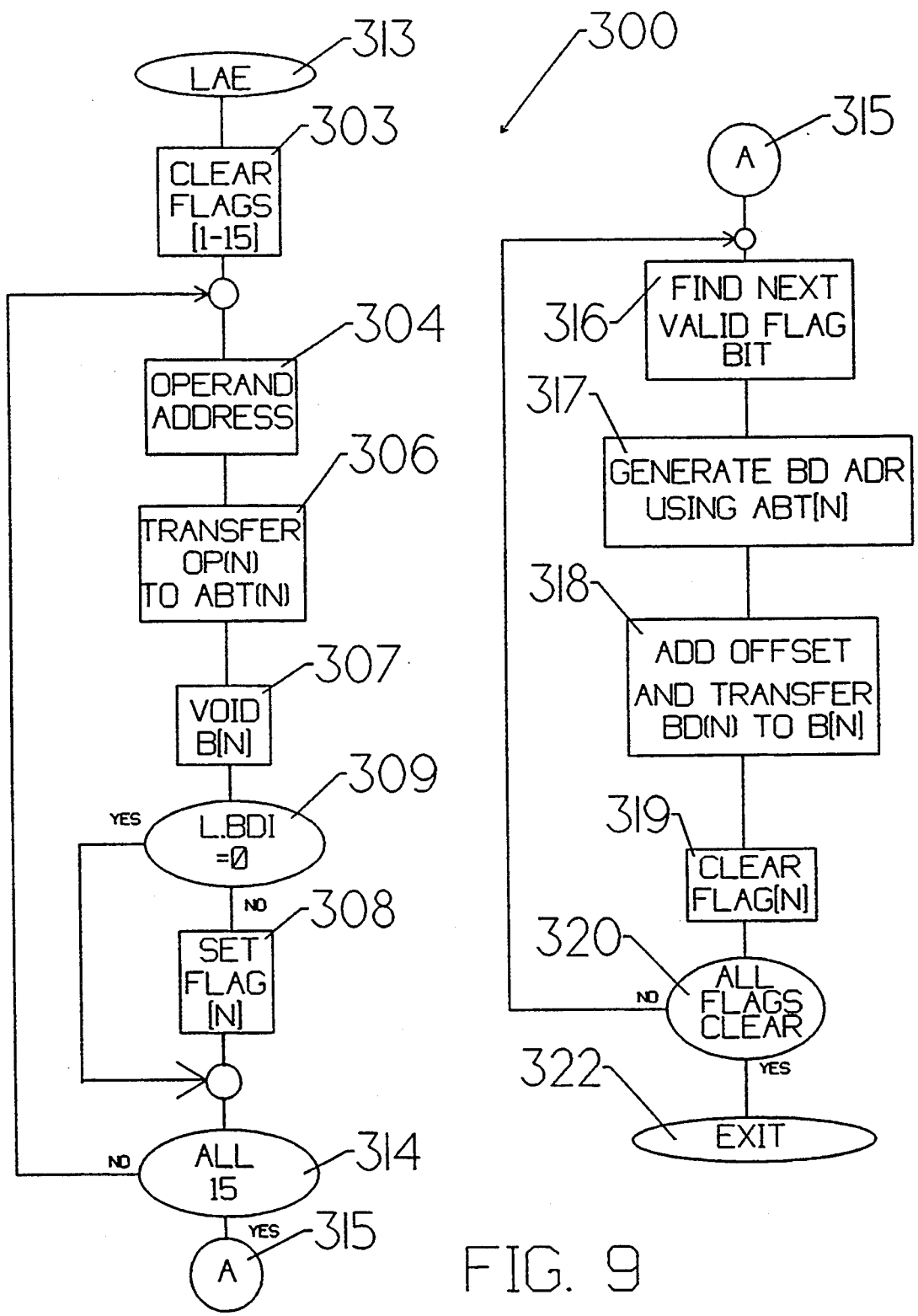
FIG. 9 is a flow diagram of the operation of the rapid active load environment instruction.

FIG. 9 is a flow diagram 300 for the operation of the load addressing environment (i.e. LAE) instruction. Element 313 signifies initial identification of the LAE instruction. In the preferred embodiment, and not to be deemed as limiting of the present invention, the LAE instruction is designated by a function code of $73_8$ and a "J" field of $15_8$, and an "A" field of $12_8$. Element 303 clears all 15 flag bits within flag register 250 (see also FIG. 8).

Element 304 computes the operand address. The operand address is computed as with other operand addresses except that this is an extended cycle instruction providing for access to more than one double word operand.

Each of the individual virtual addresses are sequentially loaded into the corresponding one of the locations of active base table 254 (see also FIG. 8) at element 306. Except for the first iteration, these are done in pairs. As each is loaded, element 307 invalidates the previous contents of the associated base register. Element 309 (i.e. comparitor 246) determines whether the associated L,BDI field (i.e. bit positions 0–17) is zero. If the L,BDI field is not zero, the corresponding flag bit is set valid by element 308 (see also FIG. 8). Element 314 counts to ensure that all 15 base register positions are compared. If not, the appropriate indices are incremented and control is returned to element 304 for processing the next entry. After all 15 virtual addresses have been processed, control is given to element 316 via connector 315.

The second pass through the 15 potential base register entries is initiated upon the first transfer of control to element 316. The flag bits of flag bit register 250 are scanned with priority encoder logic to find the next valid bit indication. An absolute address is generated by accessing the entry specified by the BDI field of that base descriptor table specified by the L field. Element 318 adds the contents of the offset field and transfers the absolute address thus computed to the associated base register of base register stack 214. The corresponding flag bit is cleared by element 319. Control is returned to element 316 by element 320 until all set flag bits have been cleared. The instruction is complete at element 322. The length of time required to pass from element 314 to element 322 is a function of the number of valid bit indications in the flag bit register. The fewer flag bits set, the less time that is required for performance of the LAE instruction.

Having thus described the preferred embodiments of the present invention, those of skill in the art will readily appreciate that the teachings found herein may be applied to yet other embodiments within the scope of the claims hereto attached.

We claim:
1. An apparatus comprising:

a. a memory for storing instructions and operands accessible using absolute addresses;
b. an instruction processor having a virtual address port coupled to said memory for executing said instructions using said operands under control of a program which references said operands using a plurality of virtual addresses;
c. an active base table having a plurality of registers and also having a data input port and a data output port wherein the contents of each of said plurality of registers can be accessed with an active base table index and wherein said data input port of said active base table is coupled to said virtual address port of said instruction processor where said active base table receives said plurality of virtual addresses from said virtual address port of said instruction processor;
d. a comparator coupled to said virtual address port of said instruction processor for comparing each of said plurality of virtual addresses being transmitted by said instruction processor to said plurality of registers of said active base table with a predetermined set of valid values;
e. a plurality of flag register bits each bit corresponding to one of said plurality of registers of said active base table;
f. a priority controller coupled to said plurality of flag register bits for indicating which of said plurality of flag register bits are set;
g. a microcontroller coupled to said comparator, said active base table, said plurality of flag register bits, and said priority controller for providing said active base table index to said active base table for loading said plurality of virtual address from said instruction processor into said plurality of registers of said active base table and for setting the appropriate one of said plurality of flag register bits if said comparator indicates that said corresponding one of said plurality of registers of said active base table contains a valid virtual address and for receiving the output of said priority controller to control said active base table index such that only said plurality of registers of said active base table which contain a valid virtual address are read out of said active base table;
h. a plurality of base descriptor tables coupled to said active base table for converting said valid virtual addresses provided from said active table into a plurality of absolute base addresses;
i. a plurality of base registers coupled to said plurality of base descriptor tables for storing said plurality of absolute base addresses; and
j. a translator circuit coupled to said plurality of base registers and to said instruction processor for adding said plurality of absolute base addresses to a plurality of relative addresses of said instruction processor to produce a plurality of absolute address for accessing said memory.

2. An apparatus comprising:
a. a memory for storing instructions and operands accessible using absolute addresses;
b. an instruction processor having a virtual address port coupled to said memory for executing said instructions using said operands under control of a program which references said operands using a plurality of virtual addresses;
c. an active base table coupled to said instruction processor where said active base table receives said plurality of virtual addresses from said instruction processor;

d. a comparator coupled to said instruction processor and to said active base table for comparing each of said plurality of virtual addresses being transmitted by said instruction processor to said active base table with a predetermined set of valid values;

e. a flag register for storing which of said plurality of virtual addresses stored in said active base table are valid;

f. a priority controller coupled to said flag register for indicating which of said plurality of virtual addresses stored in said active base table are valid;

g. a microcontroller coupled to said comparator, said active base table, said flag register, and said priority controller for loading said plurality of virtual address from said instruction processor into said active base table and for transmitting to said flag register a valid indicator if said comparator indicates that said virtual address being transmitted from said instruction process to said active base table is valid and for receiving the output of said priority controller to control the reading of said active base table such that only valid virtual address are read out of said active base table;

h. a plurality of base descriptor tables coupled to said active base table for converting said valid virtual addresses provided from said active table into a plurality of absolute base addresses;

i. a plurality of base registers coupled to said plurality of base descriptor tables for storing said plurality of absolute base addresses; and j. a translator circuit coupled to said plurality of base registers and to said instruction processor for adding said plurality of absolute base addresses to a plurality of relative addresses of said instruction processor to produce a plurality of absolute address for accessing said memory.

3. A method for loading an addressing environment comprising:

a. accessing a first a plurality of virtual addresses;

b. determining whether said first of said plurality of virtual addresses is valid;

c. storing a corresponding flag indicating whether said first of said plurality of virtual addresses is valid;

d. loading a corresponding register of a register stack with said first of said plurality of virtual addresses;

e. repeating steps a, b, c, and d for each of said plurality of virtual addresses;

f. reading said corresponding flag to determine whether said first of said plurality of virtual addresses was determined to be valid;

g. reading said first of said plurality of virtual addresses from said corresponding register of said register stack if and only if step (f) indicates that said first of said plurality of virtual addresses was determined to be valid;

h. translating said first of said plurality of virtual addresses to an absolute address if and only if step (f) indicates that said first of said plurality of virtual addresses was determined to be valid; and i. repeating steps f, g, and h for each of said plurality of virtual addresses stored in said register stack;

4. An apparatus comprising:

a. storing means for storing instructions and operands accessible using absolute addresses;

b. executing means having a virtual address port coupled to said storing means for executing said instructions using said operands under control of a program which references said operands using a plurality of virtual addresses;

c. second storing means coupled to said executing means wherein said second storing means receives said plurality of virtual addresses from said executing means;

d. comparing means coupled to said executing means and to said second storing means for comparing each of said plurality of virtual addresses being transmitted by said executing means to said second storing means with a predetermined set of valid values;

e. flag storing means for storing which of said plurality of virtual addresses stored in said second storing means are valid;

f. indicating means coupled to said flag storing means for indicating which of said plurality of virtual addresses stored in said second storing means are valid;

g. controller means coupled to said comparing means, said second storing means, said flag storing means, and said indicating means for loading said plurality of virtual address from said executing means into said second storing means and for transmitting to said flag storing means a valid indicator if said comparing means indicates that said virtual address being transmitted from said executing means to said second storing means is valid and for receiving the output of said indicating means to control the reading of said second storing means such that only valid virtual address are read out of said second storing means;

h. converting means coupled to said second storing means for converting said valid virtual addresses provided from said second storing means into a plurality of absolute base addresses;

i. third storing means coupled to said plurality of converting means for storing said plurality of absolute base addresses; and j. adding means coupled to said third storing means and to said executing means for adding said plurality of absolute base addresses to a plurality of relative addresses of said executing means to produce a plurality of absolute address for accessing said storing means.

* * * * *